Jan. 16, 1968 C. L. FRASIER 3,363,804
APPARATUS FOR FEEDING MATTRESS HANDLES AND OTHER ARTICLES
Filed March 23, 1966
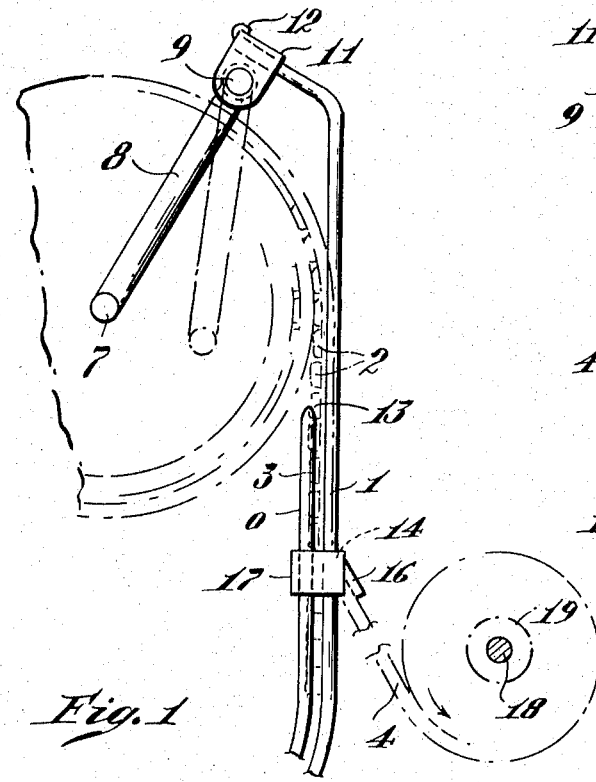
Fig. 1
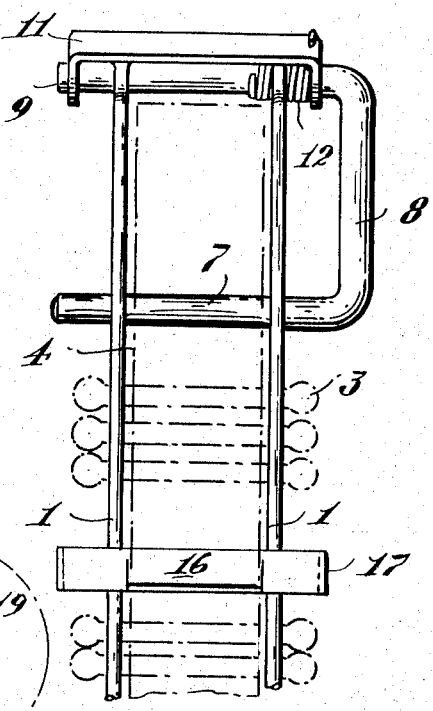
Fig. 2
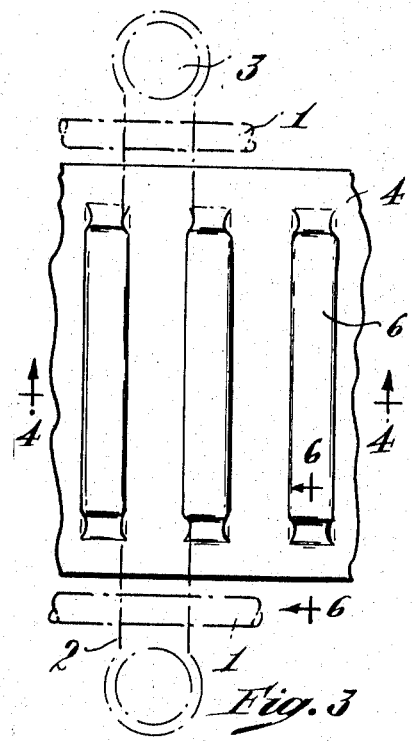
Fig. 3
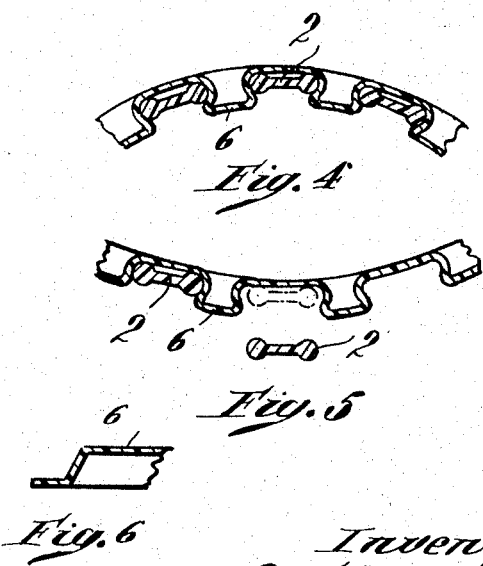
Fig. 4
Fig. 5
Fig. 6
Inventor
Curtis L. Frasier
by Roberts, Cushman & Grover
Att'ys

United States Patent Office 3,363,804
Patented Jan. 16, 1968

3,363,804
APPARATUS FOR FEEDING MATTRESS
HANDLES AND OTHER ARTICLES
Curtis L. Frasier, Rye, N.H., assignor to The Morley Company, Portsmouth, N.H., a corporation of Maine
Filed Mar. 23, 1966, Ser. No. 536,726
1 Claim. (Cl. 221—72)

In machines for attaching mattress handles to strips of mattress material it has been customary to feed the handles into the machine by hand as disclosed in my prior Patent 3,064,264, granted Nov. 20, 1962. This method of feeding is not only slow and tedious but it often results in the handles getting misaligned and thereby jamming.

Objects of the present invention are to provide means for feeding articles automatically and in close succession so that they cannot jam.

This invention involves apparatus for feeding articles to a delivery station which comprises a flexible belt having grippers distributed along one side with spaces therebetween, the grippers projecting from the belt so that said spaces narrow when the belt is flexed in one direction, thereby to grip articles therebetween, and the spaces widen when the belt is flexed in the opposite direction, thereby to release the articles, means for feeding the belt along a predetermined path leading to said station with articles gripped in said spaces as aforesaid, and means at said station to flex the belt in said opposite direction, thereby to release the articles.

More specifically the apparatus is further characterized by a feed chute having an entrance to receive said articles, said station being disposed along the chute beyond said entrance, by means beyond said station for advancing said belt, the ends of said articles project beyond the edges of said belt and said chute comprises guides for said ends, and said chute has a vertical component at said station so that the articles feed from the station by gravity. In the preferred embodiment the apparatus is further characterized by a roll of said belt and means for supporting the roll tangentially to said chute, said supporting means being movable toward the chute, thereby to maintain the tangential relation between roll and chute as the roll decreases in diameter.

For the purpose of illustration a typical embodiment is shown in the accompanying drawings in which FIG. 1 is a front view corresponding to FIG. 3 of the aforesaid patent;

FIG. 2 is a view from the right-hand side of FIG. 1;

FIG. 3 is a plan view of the belt;

FIG. 4 is a section on line 4—4 of FIG. 3 showing the belt flexed in the direction to grip mattress handles;

FIG. 5 is a similar section showing the belt flexed in the reverse direction to release the articles; and FIG. 6 is a section on line 6—6 of FIG. 3.

The particular embodiment of the invention chosen for the purpose of illustration comprises a machine such as disclosed in the aforesaid patent except in that the feed chute has a straight upper end instead of being curved throughout its length as shown at 40 in the patent. The feed chute comprises rear guides 0 and front guides 1. The mattress handles 2 slide between the front and rear guides with their enlarged ends 3 disposed outside the guides to prevent lengthwise movement of the handles as they slide down the guides.

According to this invention the apparatus comprises a belt 4 having grippers 6 projecting from one side. Preferably the belt is made of plastic material with the grippers comprising integral parts of the belt. While the opposing faces of the grippers may be parallel to each other when the belt is straight, preferably they are recessed as shown in FIGS. 4 and 5. When the belt is flexed in the direction shown in FIG. 4 the handles are held between the grippers and when the belt is flexed in the reverse direction as shown in FIG. 5 the handles are released.

As shown in FIG. 1 a roll of belt charged with handles is mounted on a spindle 7 so that the periphery of the roll is tangent to the chute 0–1. The spindle 7 is mounted on an arm 8 of a shaft 9 pivotally mounted in a bracket 11 with a spring 12 yieldingly to urge the arm 8 in a counterclockwise direction (FIG. 1) so as to keep the periphery of the roll tangent to the chute as the roll diminishes in diameter. The entrance to the chute is at 13 and the delivery station is at 14 where the belt flexes in reverse direction to release the handles and permit them to continue downwardly through the chute by gravity. The belt is guided out of the chute by a flange 16 on a bracket 17 mounted on the chute. The empty belt is wound on a spindle 18 which is driven by a motor through a friction clutch 19 in the usual manner of take-up reels.

As shown in FIGS. 3 and 6 the recesses between the grippers 6 are elongate so as to grip articles along extensive areas and they terminate short of the edges of the belt so that the margins of the belt bear on the spindle 7 continuously.

From the foregoing it will be understood that the handles are fed into the chute in close succession so that when released from the belt at the delivery station 14 they continue to slide downwardly through the chute in contact with each other so that they have no opportunity to get misaligned and jammed in the chute.

It should be understood that the present disclosure is for the purpose of illustration only and that this invention includes all modifications and equivalents which fall within the scope of the appended claim.

I claim:
1. Apparatus for feeding articles to a delivery station which comprises a flexible belt having grippers distributed along one side with spaces therebetween, the grippers projecting from the belt so that spaces narrow when the belt is flexed in one direction, thereby to grip articles therebetween, and the spaces widen when the belt is flexed in the opposite direction, thereby to release the articles, means for feeding the belt along a predetermined path leading to said station with articles gripped in said spaces as aforesaid, and means at said station to flex the belt in said opposite direction, thereby to release the articles, characterized in that said belt consists of an integral piece of plastic material, said grippers comprising raised portions of the material which are elongate and extend transversely of the belt, the margins of the belt extending continuously lengthwise of the belt beyond the ends of the elongate portions, said raised portions being hollow and having approximately the same thickness as said margins and the portions between the raised portions.

References Cited

UNITED STATES PATENTS

| 2,139,886 | 12/1938 | Drachenberg | 221—72 X |
| 2,988,199 | 6/1961 | Pinkham | 198—179 X |
| 3,048,268 | 8/1962 | Rocchi et al. | 221—72 |

STANLEY H. TOLLBERG, Primary Examiner.